US011089214B2

(12) United States Patent
Stokking et al.

(10) Patent No.: US 11,089,214 B2
(45) Date of Patent: Aug. 10, 2021

(54) GENERATING OUTPUT VIDEO FROM VIDEO STREAMS

(71) Applicants: Koninklijke KPN N.V., Rotterdam (NL); Nederlandse Organisatie voor Toegepast-Natuurwetenschappelijk Onderzoek TNO, s-Gravenhage (NL)

(72) Inventors: Hans Maarten Stokking, Wateringen (NL); Emmanuel Thomas, Delft (NL); Omar Aziz Niamut, Vlaardingen (NL); Martin Prins, The Hague (NL)

(73) Assignees: KONINKLIJKE KPN N.V., Rotterdam (NL); NEDERLANDSE ORGANISATIE VOOR TOEGEPAST-NATUUR-WETENSCHAPPELIJK ONDERZOEK TNO, 'S-Gravenhage (NL)

( * ) Notice: Subject to any disclaimer, the term of this patent is extended or adjusted under 35 U.S.C. 154(b) by 215 days.

(21) Appl. No.: 16/061,320

(22) PCT Filed: Dec. 16, 2016

(86) PCT No.: PCT/EP2016/081376
§ 371 (c)(1),
(2) Date: Jun. 11, 2018

(87) PCT Pub. No.: WO2017/103065
PCT Pub. Date: Jun. 22, 2017

(65) Prior Publication Data
US 2019/0045119 A1 Feb. 7, 2019

(30) Foreign Application Priority Data

Dec. 17, 2015 (EP) .................................... 15200626

(51) Int. Cl.
*H04N 5/232* (2006.01)
*H04N 21/654* (2011.01)
(Continued)

(52) U.S. Cl.
CPC ..... *H04N 5/23238* (2013.01); *G06K 9/00758* (2013.01); *H04N 5/232* (2013.01);
(Continued)

(58) Field of Classification Search
CPC .................................................. H04N 5/23238
(Continued)

(56) References Cited

U.S. PATENT DOCUMENTS 8,702,000 B2 4/2014 Barber et al.
2010/0214419 A1* 8/2010 Kaheel ............. H04N 21/25841
348/207.1

(Continued)

FOREIGN PATENT DOCUMENTS

WO WO 2017/103065 A1 6/2017
WO WO 2019/092161 A1 5/2019

OTHER PUBLICATIONS

Notification of Transmittal of the International Search Report and Written Opinion for International Application No. PCT/EP2016/081376, titled: Generating Output Video From Video Streams, dated Feb. 14, 2017.

(Continued)

*Primary Examiner* — Yulin Sun
(74) *Attorney, Agent, or Firm* — Hamilton, Brook, Smith & Reynolds, P.C.

(57) ABSTRACT

A system and method are provided for generating an output video, such as a video panorama, from a plurality of video streams representing different recordings of a scene. The plurality of video streams may be analyzed to identify at least one part of at least one of the plurality of video streams (Continued)

which is to be used in the output video, thereby identifying a contributing part of a video stream. Orchestration metadata may be generated identifying the contributing part. The orchestration metadata may be provided to a stream source from which the video stream originated to enable the stream source to selectively stream the contributing part of the video stream. Effectively, a selection of the stream's video data may be made to avoid or reduce unnecessary bandwidth usage.

16 Claims, 7 Drawing Sheets

(51) Int. Cl.
  *H04N 21/234* (2011.01)
  *H04N 21/4402* (2011.01)
  *H04N 13/161* (2018.01)
  *G06K 9/00* (2006.01)
  *G11B 27/036* (2006.01)
(52) U.S. Cl.
  CPC ..... *H04N 5/23206* (2013.01); *H04N 5/23222* (2013.01); *H04N 13/161* (2018.05); *H04N 21/23418* (2013.01); *H04N 21/440245* (2013.01); *H04N 21/654* (2013.01); *G11B 27/036* (2013.01); *H04N 2213/003* (2013.01)
(58) Field of Classification Search
  USPC .......................................................... 348/38
  See application file for complete search history.

(56) References Cited

U.S. PATENT DOCUMENTS

| | | | |
|---|---|---|---|
| 2011/0255589 A1* | 10/2011 | Saunders | H04N 19/122 375/240.01 |
| 2012/0050524 A1 | 3/2012 | Rinner et al. | |
| 2012/0060077 A1* | 3/2012 | Mate | G06F 16/739 715/200 |
| 2014/0254919 A1 | 9/2014 | Sun et al. | |
| 2014/0307775 A1 | 10/2014 | Ouedraogo et al. | |
| 2017/0124717 A1 | 5/2017 | Baruch et al. | |

OTHER PUBLICATIONS

Lee, J-T., et al., "Stitching of Heterogeneous Images Using Depth Information", School of Electrical Engineering, Korea University, Seoul Korea—no date provided.
Kaheel, A., et al., "Mobicast: A System for Collaborative Event Casting Using Mobile Phones", ACM, Nov. 22-25, 2009.
Wang, Y., et al., "PanoSwarm: Collaborative and Synchronized Multi-Device Panoramic Photography", arXiv: 1507.01147v3 [ cs.HC} Jul. 10, 2015.
Baudisch, P., et al., "Panoramic Viewfinder: Providing a Real-Time Preview to Help Users Avoid Flaws in Panoramic Pictures", Microsoft Research, 2005.
He, B., et al., "Panoramic Video Stitching in Multi-Camera Surveillance System", IEEE, 2010.
Refaat, M., et al., "Active Feedback for Enhancing the Construction of Panoramic Live Mobile Video Streams", IEEE, 2011.
European Search Report for EP Application No. 15200626.8, titled: Generating Output Video From Video Streams, dated Jun. 20, 2016.
Caselle, Michele, et al. "Ultrafast Streaming Xamera Platform for Scientific Applications," *IEEE Transactions on Nuclear Science*, 60(5): 3669-3677 (2013).
Camplani, M., & L. Salgado, "Background foreground segmentation with RGB-D Kinect data: An efficient combination of classifiers," *Journal of Visual Communication and Image Representation*, 25(1): 122-136 (2014).
Ochi, Daisuke, et al. "Live Streaming System for Omnidirectional Video," *Virtual Reality (VR) Conference 2015*, IEEE, pp. 349-350 (2015).
Samet, H. and M. Tamminen, "Efficient Component Labeling of Images of Arbitrary Dimension Represented by Linear Bintrees," *IEEE Transactions on Pattern Analysis and Machine Intelligence. IEEE*. 10(4): 579-586 (1988).
Schrey, Olaf, et al., "A 1K x 1K High Dynamic Range CMOS Image Sensor with On-Chip Programmable Region-of-Interest Readout," *IEEE Journal of Solid-State Circuits* 37(7): 911-915 (2002).
Series H: Audiovisual and Multimedia Systems: Infrastructure of Audiovisual services—Coding of moving video, International Telecommunication Union, Telecommunication Standardization Sector of ITU, H.265: (Dec. 2016).
Mahy, R., et al., "Traversal Using Relays around NAT (TURN): Relay Extensions to Session Traversal Utilities for NAT (STUN)," *Internet Engineering Task Force (IETF)*, Apr. 2010.

* cited by examiner

GENERATING OUTPUT VIDEO FROM VIDEO STREAMS

RELATED APPLICATIONS

This application is the U.S. National Stage of International Application No. PCT/EP2016/081376, filed on Dec. 16, 2016, which designates the U.S., published in English, and claims priority under 35 U.S.C. § 119 or 365(c) to European Application No. 15200626.8, filed on Dec. 17, 2015. The entire teachings of the above applications are incorporated herein by reference.

FIELD OF THE INVENTION

The invention relates to a method and system for generating an output video, such as a composite video, from a plurality of video streams representing different recordings of a scene. The invention further relates to a computer program comprising instructions for causing a processor system to perform the method, to a data structure for use in generating the output video, and to a stream source.

BACKGROUND ART

It is known to generate a composite video from a plurality of video streams representing different recordings or captures of a scene. For example, the composite video of the scene may be generated from a combination of multiple videos recorded by multiple unsupervised (mobile) devices. In such a situation, it may be possible to create a composite view of the scene by combining the recordings of the multiple devices. The composite view may be enhanced, in that it may provide a wider field of view of the scene, a higher spatial resolution, a higher frame rate, etc.

In case of a wider field of view, such a composite video is often referred to as a panorama, and may involve a stitching technique to process the individual and separate videos in such a way that they jointly provide a composite and panoramic video. The real-time stitching of multiple videos is known to be a computationally intensive and memory consuming task. Therefore, research has been previously directed at developing efficient algorithms which may be performed on a stitching server and which may improve the visual quality of the stitched video and increase the framerate of the stitching process, e.g., the number of frames per second being generated, and thus, the framerate of the resulting panoramic video.

Disadvantageously, when generating an output video from different recordings of a scene, there may be insufficient coordination between the different recordings, which may reduce or limit the quality of the output video.

A paper titled "*Active feedback for enhancing the construction of panoramic live mobile video streams*" by Refaat et al, *Multimedia and Expo (ICME)*, pp. 1-6, 11-15 Jul. 2011, deals with multiple users live streaming the same scene from different angles, using their mobile phones, with the objective of constructing a panoramic video of the scene. The authors recognize that a lack of coordination between the streaming users may result in too much, too little, or no overlap between incoming streams for the stitching to properly work. To add to the challenge, the streaming users are generally free to move, which means that the amount of overlap between the different streams is dynamically changing. To address these problems, the authors propose providing feedback from a feedback manager to the capture devices, with the capture devices then showing hints (arrows) to the users on how to adjust the recording. For example, an arrow to the left may indicate that the user should direct the camera to the left.

Disadvantageously, the authors of the above identified paper rely on the user to optimally capture the scene, and in particular to avoid too much overlap between the incoming streams. However, if a user does not, or cannot adjust the view of the scene being recorded, there may continue to exist too much overlap between the incoming streams. Too much overlap between the incoming streams implies that redundant video data will be transmitted, unnecessarily consuming bandwidth.

SUMMARY OF THE INVENTION

It would be advantageous to obtain a method or system for generating an output video from a plurality of video streams representing different recordings of a scene, which avoids or reduces unnecessary bandwidth usage.

In accordance with a first aspect of the invention, a method is provided for generating an output video from a plurality of video streams representing different recordings of a scene. The method may comprise:
  receiving the plurality of video streams;
  analyzing the plurality of video streams to identify at least one part of at least one of the plurality of video streams which is to be used in the output video, thereby identifying a contributing part of a video stream;
  generating orchestration metadata identifying the contributing part;
  providing the orchestration metadata to a stream source from which the video stream originated to enable the stream source to selectively stream the contributing part of the video stream.

In accordance with a further aspect of the invention, a system is provided for generating an output video from a plurality of video streams representing different recordings of a scene. The system may comprise:
  an input interface for receiving the plurality of video streams;
  a processor configured for analyzing the plurality of video streams to identify at least one part of at least one of the plurality of video streams which is to be used in the output video, thereby identifying a contributing part of a video stream;
  a controller configured for generating orchestration metadata identifying the contributing part; and
  an output interface for providing the orchestration metadata to a stream source from which the video stream originated to enable the stream source to selectively stream the contributing part of the video stream.

The above measures involve combining a plurality of video streams into an output video. For that purpose, the plurality of video streams are received, e.g., via a network, and then analyzed. As a result of the analysis, at least one part of at least one of the plurality of video streams is identified which is to be used in the output video. Optionally, other parts of the same, or different video streams, may also be identified. The at least one part is considered to be a contributing part of said video stream, which is then identified to the stream source by way of orchestration metadata.

The above measures have as effect that the stream source is informed about which part of the video stream is to be used in the output video. As such, the stream source is enabled to henceforth selectively stream the contributing part of the video stream, e.g., by omitting transmitting one or more non-contributing parts of the video stream. Effectively, a selection of the stream's video data is made which is to be streamed. In particular, by selectively streaming the contributing part of the original video stream, a bitrate-reduced video stream may be created as at least some non-contributing parts, e.g., spatial regions and/or temporal frames, are omitted from the video stream. As the non-contributing parts are likely not to be used in the output video, this selective streaming may avoid or reduce unnecessary bandwidth usage. An additional advantage may be that the computational load associated with generating the output video may be reduced, for example by fewer or even no parts of the video streams having to be processed which do not contribute to the output video.

It will be appreciated that the contributing part may have multiple occurrences in the video stream. For example, the contributing part may be a spatial region in a plurality of adjacent video frames, or may represent a temporal (sub-) selection of frames of the video stream. The occurrences may be at regular intervals, e.g., each frame or at a certain (temporal) distance. Accordingly, by identifying one occurrence of the contributing part to the stream source, the stream source may be enabled to selectively stream further occurrences of the contributing part.

It will be appreciated that the analysis may be performed continuously, or at regular intervals, to take into account that the contribution of the video stream to the output video may change over time. Accordingly, the orchestration metadata may be updated, e.g., re-generated, and be provided to the stream source. For enabling such analysis, the stream source may, in addition to selectively stream the contributing part of the video, also stream a part of which the probability is relatively high that it may contribute to the output video, such as a surrounding of the contributing part. For example, in case the contributing part is a spatial region, the stream source may transmit the spatial region including a border around the spatial region.

In an embodiment, the output video may be a composite of the plurality of video streams. Examples of composites include spatial composites, temporal composites or spatiotemporal composites. Accordingly, the contributing part may be a spatial part, temporal part or spatiotemporal part of the video stream. An example of a contributing spatial part is a spatial region, or a plurality of unconnected spatial regions. An example of a contributing temporal part is a selected frame or plurality of frames, e.g., representing a temporal sub-sampling or down-conversion of the originally recorded video. For example, the scene may be originally recorded at 60 Hz, and then sub-sampled or down-converted to 24 Hz to obtain a 24 Hz video stream. By temporally combining several of such sub-sampled or down-converted video streams, the temporal composite may have a higher frame rate, e.g., 60 Hz or even higher.

In an embodiment, the composite may be a spatial composite of the plurality of video streams, and the contributing part may be a spatial region of the video stream which is to be included in the spatial composite. An example of a spatial composite is a video panorama. As such, a wider field of view of the scene may be provided.

In an embodiment, the stream source may be a recording device, and the method may further comprise including one or more adjustment instructions in the orchestration metadata, the one or more adjustment instructions being indicative of an adjustment in the recording of the video stream which changes a size or location of the spatial region in the spatial composite. The adjustment instructions may represent feedback to one or more of the stream sources. Such feedback may be provided with the aim to more efficiently generate the output video. For example, in case of the output video being a composite, the feedback may ensure that the contributing parts of the video streams are complementary and have a limited amount of overlap. In an embodiment, the one or more adjustment instructions may be user instructions for, when provided to the user, enabling the user to adjust a view of the scene being recorded by the recording device. Alternatively, the one or more adjustment instructions may also be applied autonomously or semi-autonomously by the device itself. In a further embodiment, the one or more adjustment instructions may be conditionally included in the orchestration metadata, e.g., when an overlap between the view provided by the video stream and the view provided by another one of the plurality of video streams crosses a predetermined threshold. In yet a further embodiment, the orchestration metadata may comprise the one or more adjustment instructions and a conditional parameter which defines a condition for when the adjustment in the recording of the video stream is to be effected. This may enable the recording device itself to monitor the condition and conditionally effect the adjustment, e.g., by effecting the one or more adjustment instructions itself or by providing adjustment instructions to the user when the condition defined by the conditional parameter is met.

In an embodiment, the orchestration metadata may comprise a set of coordinates and/or a mask identifying the spatial region of the video stream. For example, the mask may be a binary mask corresponding to the spatial region.

In an embodiment, the method may further comprise the stream source, in response to the orchestration metadata, performing at least one of:
  selectively recording the contributing part of the video stream;
  discarding non-contributing parts before encoding the video stream; and
  discarding, or reducing a bitrate of, non-contributing parts in the encoding of the video stream.

Selectively recording the contributing part of the video stream may comprise adjusting the recording itself to focus on the contributing part, e.g., by suitably panning and zooming, by adjusting a recording interval, by applying a mask to the read-out of the recording sensor, etc. Alternatively or additionally, non-contributing parts may be discarded before or during encoding, or processed in a manner so as to reduce their bitrate allocation in the video stream. For example, non-contributing spatial parts may be replaced by homogenous image data, such as uniformly black or gray pixels. Another example is that non-contributing temporal parts, e.g., in the form of non-contributing frames, may be deleted from the video stream, replaced by uniformly black or gray frames, or replaced by direct copies of temporally adjacent frames.

In an embodiment, the method may further comprise including one or more processing instructions in the orchestration metadata, the one or more processing instructions being indicative of one or more pre-processing steps to be applied by the stream source to at least the contributing part of the video stream. Here, the adjective 'pre-processing' refers to a processing that is to be performed before streaming. Such pre-processing may, for example, enable part of the computational load of generating the output video to be offloaded to one or more of the stream sources.

In an embodiment, the one or more pre-processing steps may be at least one of: temporally interpolating video frames to match a recording timestamp included in the orchestration metadata; dropping of a video frame to match a recording timestamp included in the orchestration metadata; adjusting a frame rate, applying a homographic transformation to a video frame; and adapting an image characteristic such as contrast, brightness, saturation, white point, to a reference value included in the orchestration metadata. It will be appreciated that the identifying of the contributing part in the orchestration metadata may also be seen as a processing instruction, as it is indicative of the pre-processing step of selecting video data to be streamed. Namely, the actively adjusting of the recording so as to avoid or reduce the recording of non-contributing parts may also be considered as a form of pre-processing.

In an embodiment, the method may further comprise the stream source, in addition to the video stream, making available stream metadata for use in generating the output video. Such stream metadata may provide additional information about the video stream which may be of use in generating the output video.

In an embodiment, the stream metadata may comprise at least one of: keypoint information identifying an image feature in the video stream; depth information associated with the video stream; clock information such as recording timestamps, transmission timestamps and presentation timestamps; and sensor information of a sensor used in recording the video stream. It will be appreciated that the stream metadata may comprise information such as keypoint information which may also be generated from the video stream at the receiver side. However, by already performing keypoint identification at the sender side, e.g., at the stream source, and making the keypoint information available as the stream metadata, at least part of the computational load of generating the output video may be offloaded to the sender side. Thus, the receiver (the system) may analyze the keypoint information that is available as the stream metadata to identify the contributing part, in order to facilitate or as an alternative to identifying the contributing part based on analyzing the image features in the video stream data. Conversely, the stream source may have access to information which in principle is not available at the receiver of the video stream. Accordingly, such information may be made available to the receiver by including the information as stream metadata, for example location data, orientation data, and/or focal distance.

In accordance with a further aspect of the invention, a transitory or non-transitory computer-readable medium may be provided, the computer readable medium comprising a computer program, the computer program comprising instructions for causing a processor system to perform the method.

In accordance with a further aspect of the invention, a transitory or non-transitory computer-readable medium may be provided, the computer readable medium comprising a data structure, the data structure comprising:

orchestration metadata identifying a part of a video stream; or stream metadata representing information provided by a stream source for use in generating an output video from a plurality of video streams representing different recordings of a scene.

It will be appreciated by those skilled in the art that two or more of the above-mentioned embodiments, implementations, and/or aspects of the invention may be combined in any way deemed useful.

Modifications and variations of the computer program, the data structure, the stream source and/or the system, which correspond to the described modifications and variations of the method, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1:
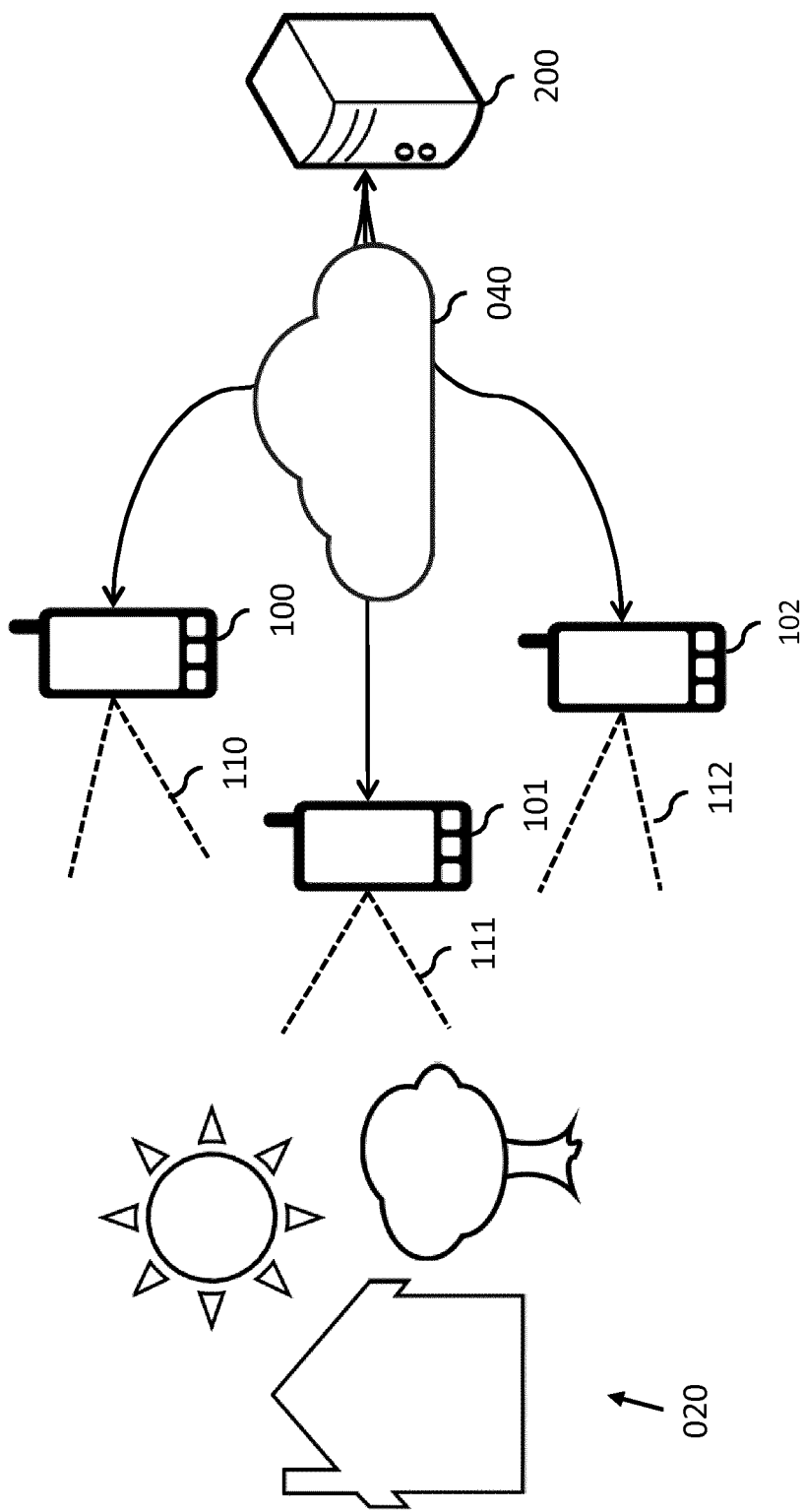
FIG. 1 shows a system for generating an output video from a plurality of video streams representing different recordings of a scene, with the plurality of video streams being streamed by a respective plurality of recording devices.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE NUMERALS

The following list of reference numbers is provided for facilitating the interpretation of the drawings and shall not be construed as limiting the claims.

020 scene
040 network
100-102 recording device streaming video stream
110-112 field of view of recording device
120 output interface
130 video stream
132 stream metadata
140 input interface
150 orchestration metadata
152 identification information
154 adjustment instructions
156 processing instructions
160, 162 captured frame
164 contributing part of captured frame
168 panorama view of scene
200 system for generating output video
202 stitching server
220 input interface
240 processor
260 controller
280 output interface
1000 exemplary data processing system
1002 processor
1004 memory element
1006 system bus
1008 local memory
1010 bulk storage device
1012 input device 1014 output device
1016 network adapter
1018 application

DETAILED DESCRIPTION OF EMBODIMENTS

FIG. 1 shows a scene 020 being recorded by a plurality of recording devices 100-102. The field of view 110-112 of the respective recording devices is schematically indicated by dashed lines, indicating that the view of the scene 020 obtained by each of the recording devices 100-102 differs. As a result, different recordings of the scene may be obtained. The recording devices 100-102 may also function as stream sources, in that they may make their recording available as a (real-time) video stream. In accordance with the invention as claimed, a system 200 may be provided for generating an output video from the plurality of video streams. In the example of FIG. 1, the system 200 is schematically shown as a server which is connected to the recording devices 100-102 via a network 040, e.g., the internet, an access network and/or a private network.

It is noted that in FIG. 1 and the following, the recording devices 100-102 are configured to function as stream sources, and thereby represent specific examples of stream sources. Examples of such recording devices include, but are not limited to, smartphones, compact cameras, professional cameras, action cameras, tablets, smart watches, smart glasses, etc. In general, the video streams may also originate from any other type of stream sources, including but not limited to (HTTP) streaming servers and stream buffer servers which buffer media stream(s) within a media distribution network.

Figure 2:
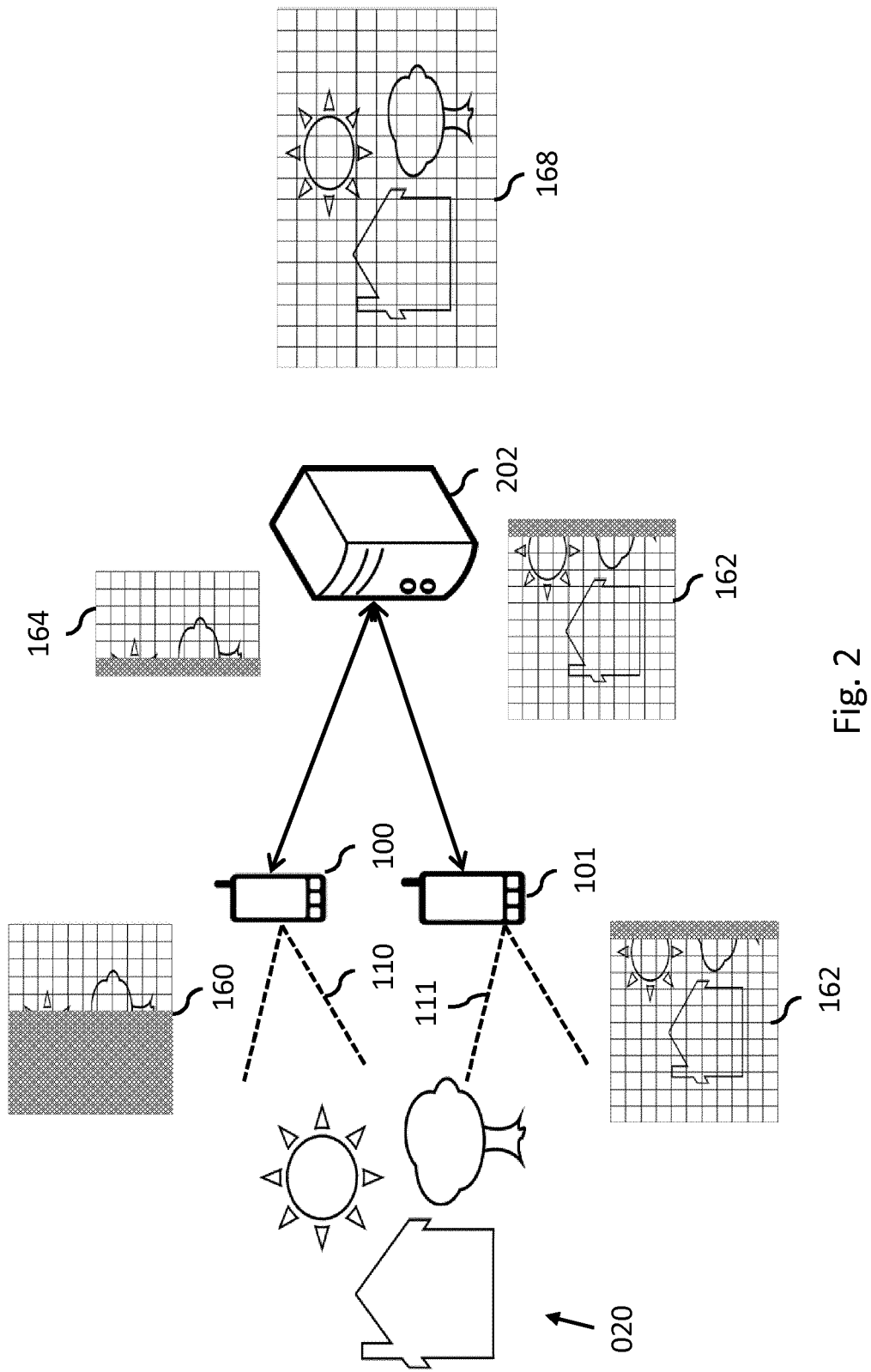
FIG. 2 illustrates a system for generating a video panorama from a plurality of video streams representing different recordings of a scene.

FIG. 2 illustrates a system for generating a video panorama from a plurality of video streams representing different recordings of a scene. In particular, FIG. 2 shows two recording devices 100, 101, being in this example smartphones, recording a scene 020, each with their respective field of view 110, 111. The first smartphone 100 may capture a first part of the scene and the second smartphone 101 may capture a second part of the scene. There may be a significant overlap in the resulting captured frames 160, 162, shown as a light greyed and dark greyed area (160 left side and the middle and 162 right side only). Each of the smartphones may be connected to a stitching server 202, sending their frames to the server and receiving instructions for pre-processing the content before sending further frames (not shown in the figure for the sake of brevity). When the stitching server 202 receives the captured frames 160, 162, it may analyze these frames as part of the stitching process. The stitching server 202 may determine there is too much overlap between the captured frames. The stitching server 202 may need some overlap to carry out the stitching, but the dark greyed areas (in the middle of part 160 and at the right in part 162) may suffice. As such, the light greyed area in captured frame 160 may not be needed by the server 202 to carry out the stitching. Therefore, the server 202 may instruct the first smartphone 100 to crop subsequent frames before encoding them and sending them to the server.

For subsequent frames, the second smartphone 101 may still send its whole captured frame. On the other hand, the first smartphone 100 may crop the captured frame according to instructions from the stitching server 202. Namely, only the contributing part 164 may need to be encoded and transmitted to the stitching server 202, having only minimal overlap with captured frame 162 to facilitate the stitching process. By not encoding the light greyed area from captured frame 160, the first smartphone 100 needs to carry out less processing. Also, because the light greyed area is also not transmitted, this omission also saves bandwidth on the connection from the first smartphone 100 to the stitching server 202. Moreover, it may reduce the computational load on the stitching server 202, as the server does not have to analyze the entire captured frame 160. So, even though the stitching server 202 has only received a part 164 of the captured frame 160, this is still sufficient for the server to combine with captured frame 162 to create a panorama view of the scene 168.

Figure 3:
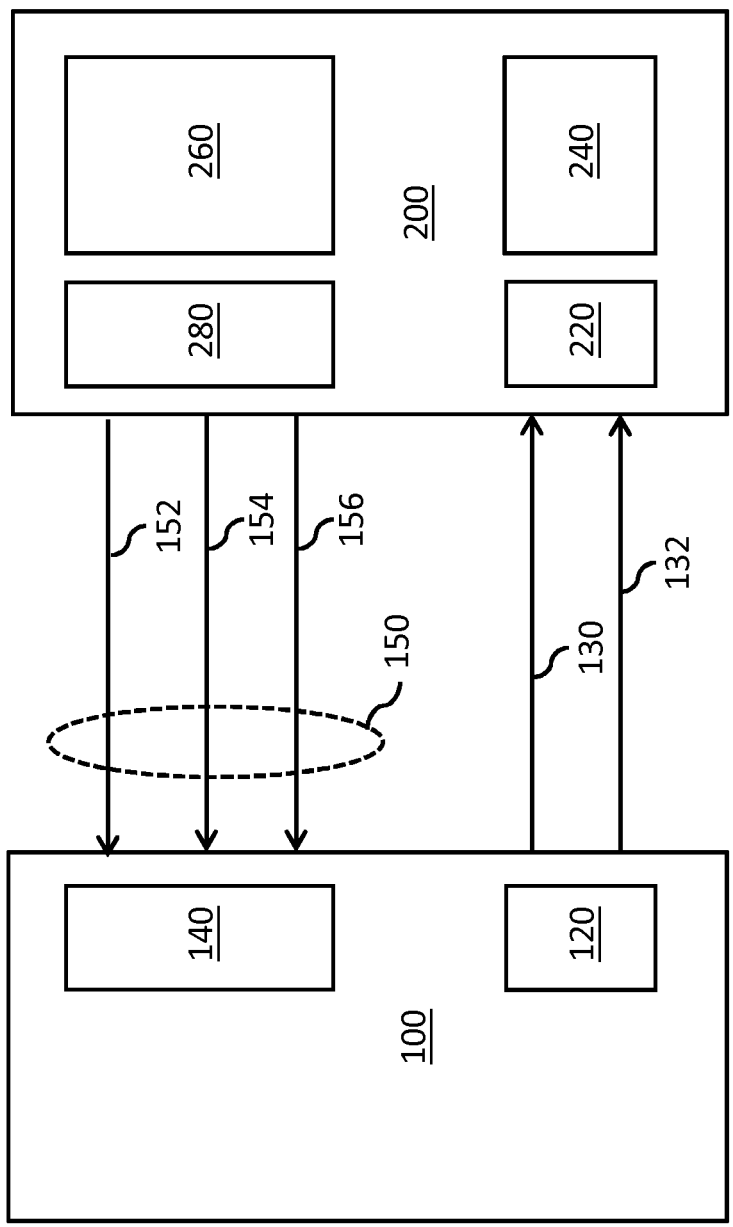
FIG. 3 shows a detailed view of the system and one of the recording devices and examples of data being exchanged between the system and the recording device.

FIG. 3 shows a detailed view of the system 200 and one of the recording devices 100 and examples of data being exchanged between the system and the recording device. The system 200 is shown to comprise an input interface 220 for receiving a video stream 130 from the recording device 100. Such a video stream may be output by the recording device 100 using an output interface 120, and may be provided to the system 200 via any suitable communication path (not shown in FIG. 3).

The system 200 is further shown to comprise a processor 240 and a controller 260. The processor 240 may be configured to, during operation of the system 200, analyze the video stream 130, as well as other video streams obtained from other recording devices (other recording devices not shown in FIG. 3). The controller 260 may be configured to, during operation of the system 200, generate orchestration metadata 150, which may then be provided via an output interface 280 and any suitable communication path to an input interface 140 of the recording device 100.

During operation of the system 200, the processor 240 may analyze the video stream 130 to identify at least one part of the video stream 130 which is to be used by the system 200 in the output video, thereby identifying a contributing part of the video stream 130. It will be appreciated that the analysis and subsequent use of a contributing part of the video stream may be known per se in the field of video processing, in that it may be part of a known technique for generating a particular type of output video from multiple video streams. For example, in case the output video is a video panorama, the known analysis may involve identifying keypoints in the video data of the different video streams and then mutually aligning the keypoints so as to generate a video panorama. It will be appreciated that the type of analysis depends on the type of output video being generated. The processor 240 thus performs such an analysis and explicitly identifies the contributing part of the video stream 130. The controller 260 may then generate the orchestration metadata 150 to comprise identification information 152 which identifies the contributing part. Upon receiving the orchestration metadata 150, the recording device 100 may then selectively stream the contributing part of the video stream 130, e.g., stream only that spatial part of following recorded video frames that are indicated by the orchestration metadata.

In a non-limiting example, the output video as generated by the system 200 may provide a spatial composite of the plurality of video streams, such as a video panorama. The contributing part may be a spatial region of the video stream 130. As such, the system 200 may communicate to the recording device 100 that it suffices to stream the spatial region of the video stream, e.g., a part of its field of view rather than all of its field of view, or the spatial region with a limited amount of surroundings. In a non-limiting example, the identification information 152 may take form of a set of coordinates and/or a mask which may identify the spatial region of the video stream. The identification information 152 may then be used by the recording device 100 to omit non-contributing parts before or during the encoding as video stream. This and other aspects of the use of the identification information 152 are described with reference to 'Identification information'. It is noted that in FIG. 3, the orchestration metadata 150 is further shown to comprise optional components such as adjustment instructions 154 and processing instructions 156, which will be discussed further onwards in this specification. It is further noted that the identification information 152 may be seen as a type, e.g., a specific example, of processing instruction 156, in that the identification information 152 may effectively instruct the recording device 100 to selectively stream the thus identified contributing part of the video stream.

Figure 4:
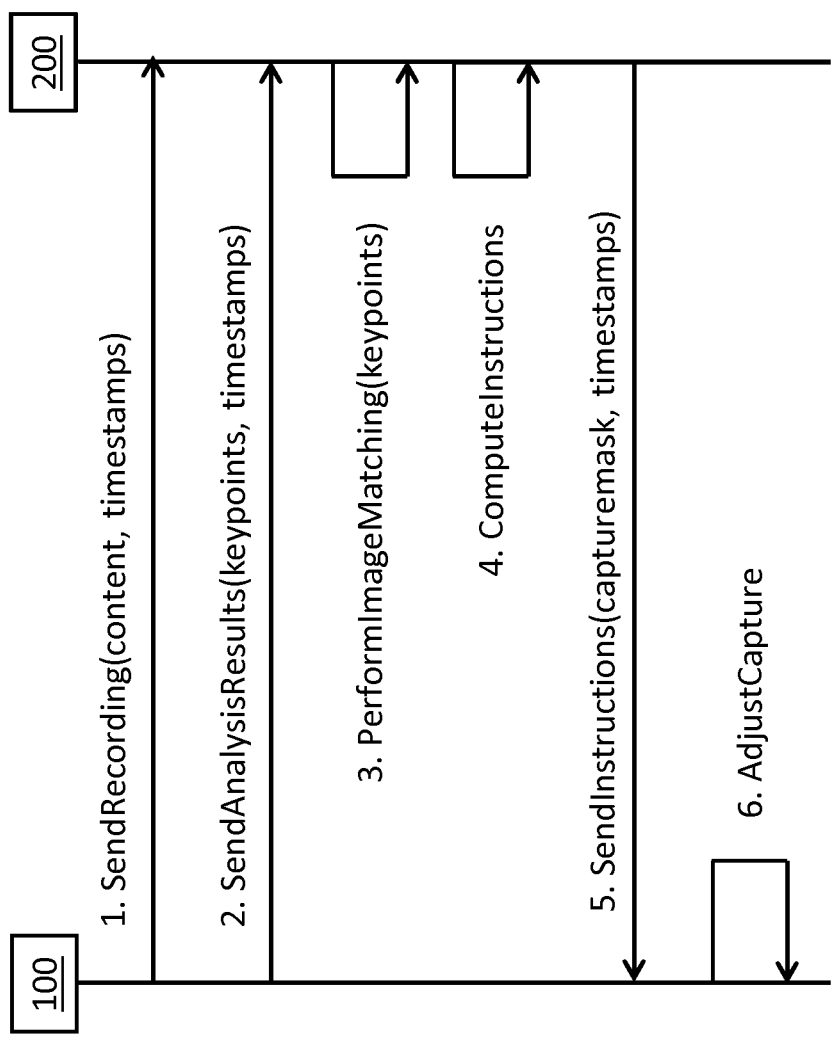
FIG. 4 shows a message exchange between the system and the recording device causing the recording device to selectively stream part of the video stream, with the recording device providing keypoint information to the system.

FIG. 4 shows a message exchange between the system 200 and the recording device 100 causing the recording device 100 to selectively stream part of the video stream. In this example, the recording device 100 is additionally shown to make available stream metadata (indicated with reference numeral 132 in FIG. 3) to the system 200, namely in the form of keypoint information. Such stream metadata may comprise information available to, or determined by the recording device, which may be used in generating the output video. In particular, by providing this information to the system 200, the system 200 may be aided in generating the output video and/or in identifying contributing parts.

In a first operation of FIG. 4 titled 'SendRecording (content, timestamps)', the recording device 100 may send the recording, i.e., the content, and associated timestamps to the system 200, e.g., in the form of a video stream. Additionally, the recording device 100 may perform a local analysis of the video content, and in particular may perform a keypoint detection. Keypoints describe local features of an image, or of video frames in a video, and include, but are not limited to, ORB, FREAK, SIFT, SURF, MPEG CDVS descriptors, as known per se in the art of image analysis and computer vision. When stitching video frames into a panorama, multiple image pairs may be matched and mutually aligned using these keypoints. By pre-computing keypoints on the recording device 100 and sending them to the system 200, e.g., in a second operation titled 'SendAnalysisResults (keypoints, timestamps)', the system 200 may identify potential stitching issues at an early stage, such as too much or too little overlap. Alternatively, the first and second operation may be combined in a single operation, e.g., by adding the keypoints as metadata to the content stream itself. In a third operation titled 'PerformImageMatching(keypoints)', the system 200 may perform the image matching using the provided keypoints. In a fourth operation titled 'ComputeInstructions', the system 200 may then compute instructions to the recording device, e.g., to offload computational load to the recording device 100 and reduce the ingest bandwidth. In the example of FIG. 4, the system 200 computes a capture mask to be applied by the recording device 100 to its recording, which may be provided to the recording device 100 together with timestamp information in a fifth operation titled 'SendInstructions(capturemask, timestamps)' and applied by the recording device 100 to its recording of the scene in a sixth operation titled 'AdjustCapture'.

It is noted that in the message exchange between the recording device 100 and the system 200, time information may be included to identify to which moment in time the particular transmitted information, such as the content, keypoints or capture mask, pertains. In general, the time information may comprise timestamps such as recording timestamps, transmission timestamps and presentation timestamps. It will be appreciated that such timestamps may enable the recording device 100 to predict a current contributing part on the basis of a previously identified contributing part. Namely, the identification of the contributing part may pertain to a view of the scene which differs from the current view of the scene being recorded. For example, when moving or turning the recording device slightly to the left, the contributing part may effectively shift slightly to the right within the recording device's field of view. By providing timestamps to the recording device 100, the recording device may take into account camera movement or other changes in the view of the scene and thus predict which part of the current view is deemed to be the currently contributing part.

Additionally or alternatively to keypoint information, a stream source may also provide other information as stream metadata, such as sensor information. Sensor information may, for example, identify the sensor used in recording the video stream, identify the sensor's sensitivity, noise profile, saturation, spatial non-uniformity, etc. Another example of stream metadata is camera orientation information. For example, the 3GPP Orientation Information allows sending video rotation via existing media transport protocols, such as RTP or WebRTC, e.g., to compensate for rotated recording devices. In particular, parameters as defined in 3GPP TS 26.244 V13 Table 8.13 under 'The Orientation Information box' may be used to signal the recording device's orientation and thereby its view, such as 'Pan', 'Pan_indication', 'Rotation' and 'Tilt'. The field of view may be further indicated by parameters such as 'Digital zoom' and 'Optical zoom'.

Figure 5:
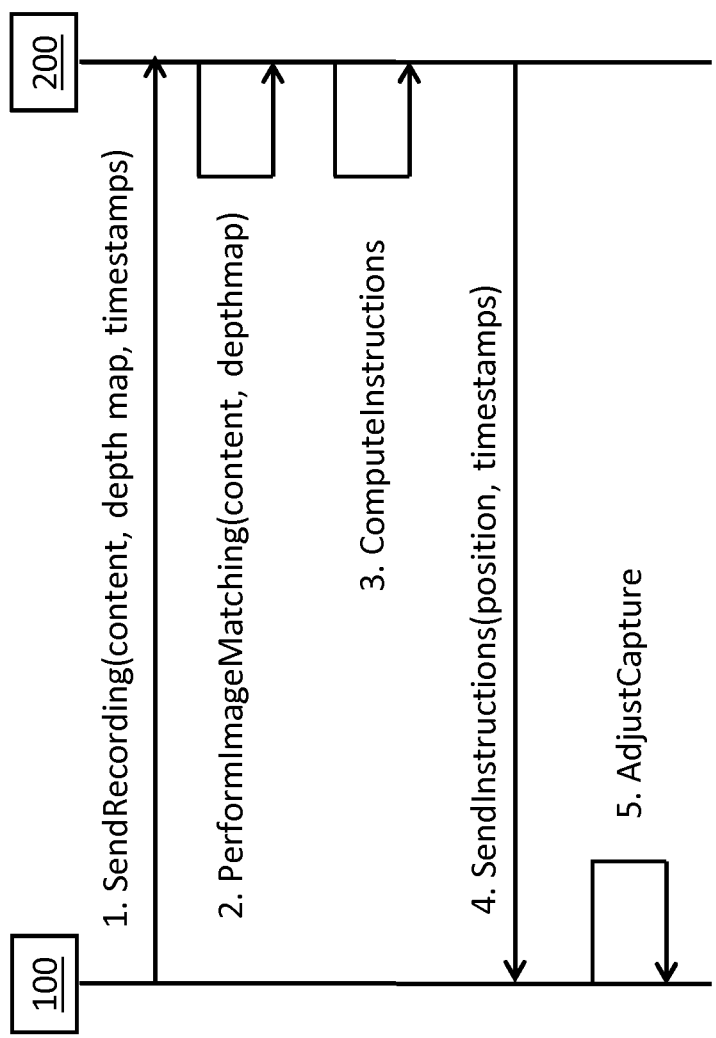
FIG. 5 shows a message exchange between the recording device and the system in which the recording device provides depth information to the system.

FIG. 5 shows a message exchange between the recording device 100 and the system 200 in which the recording device 100 provides stream metadata in the form of depth information to the system. Such depth information may be associated with the video stream in that it may indicate a depth of individual pixels, or group of pixels, of a frame of the video stream. In general, such depth information may be obtained from a depth-sensing array, time-of-flight camera, structured-light sensor or from the video data of a stereo camera, and may be represented by a depth map or other type of information which is indicative of depth, including disparity information.

Such depth information, as provided by the recording device 100 in a first operation titled 'SendRecording(content, depth map, timestamps)', may aid in generating the output video. Alternatively, the depth map information may be sent in a separate operation, using, e.g., timestamps to associate the depth map information with the actual content. For example, in case of a spatial composite such as a video panorama, 3D modelling techniques as described in the paper "*Stitching of Heterogeneous Images Using Depth Information*" by Jun-Tae Lee et al., APSIPA, 2013, pp. 1-4, Oct. 29, 2013-Nov. 1, 2013, may be used to identify potential stitching issues at a very early stage, such as suboptimal sensor position or scene occlusions. Such use of depth information has been illustrated in FIG. 5 in the form of a second operation titled 'PerformImageMatching(content, depthmap)' in which image matching is performed using the depth information. After performing the second operation, adjustment instructions are determined in third operation titled 'ComputeInstructions'. In general, such adjustment instructions may be provided as part of the orchestration metadata to indicate an adjustment to be performed in the recording of the video stream. For example, the adjustment instruction may indicate a framerate adaptation, capture mask adjustment, sensor adjustment, etc., which, when applied by the recording device, facilitates the stitching process and thereby improves the quality of the resulting stitched panoramic video. In FIG. 5, adjustment instructions in the form of a new sensor position in the captured scene are provided to the recording device 100 together with timestamps in a fourth operation titled 'SendInstructions(position, timestamps)', and applied by the recording device 100 to its recording in a fifth operation titled 'AdjustCapture'. For example, the system 200 may construct a 3D visual scene model based on the content and depth maps received from multiple (mobile) recording devices, and determine the position (combination of location and orientation) of the sensor of at least one of the recording devices in this scene. The system 200 may then use this information to 'reposition' the camera sensor, e.g., send instructions on how to move and/or rotate the camera sensor in a certain way.

Figure 6:
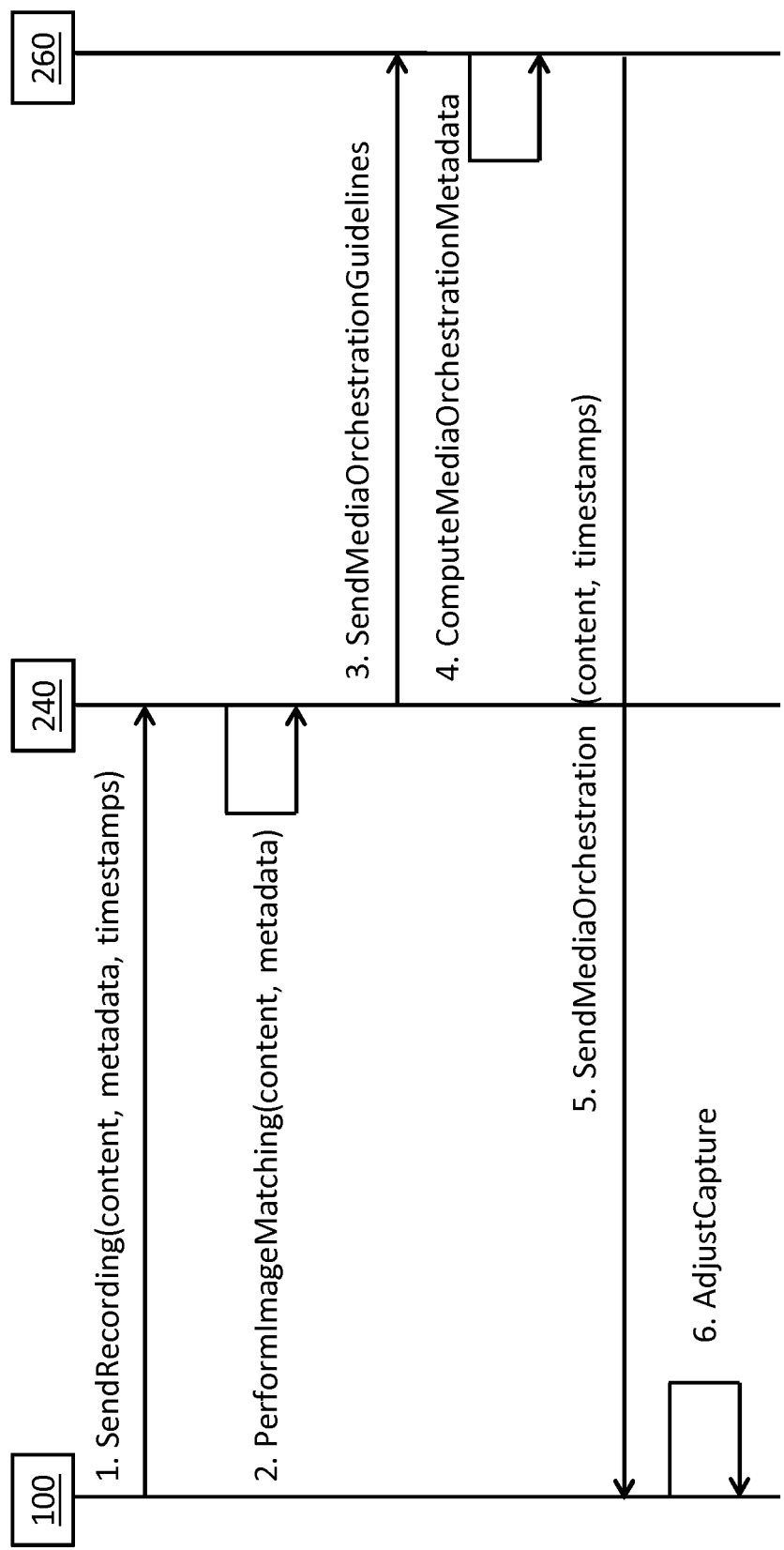
FIG. 6 shows a message exchange between the recording device and a processor and controller system of the system.

FIGS. 4 and 5 show very specific examples of how media orchestration can be applied to a system in which multiple sources provide input to a system for generating a video output. FIG. 6 shows a more general solution, abstracting from the very concrete examples given before, in which any kind of metadata can be provided by the recording device 100 to the system 200. FIG. 6 also shows that the processor 240 and controller 260 may be distributed, i.e. not be located on a single physical system. In particular, FIG. 6 shows a message exchange between the recording device 100 and the processor 240 and the controller 260 of the system. In this example, the system may function as a media orchestration system, which may associate multiple incoming streams in a media orchestration session. The processor 240 may analyze incoming content, as provided by the recording device 100 in a first operation titled 'SendRecording(content, metadata, timestamps)' in form of a video stream and associated stream metadata comprising, e.g. keypoint information, depth information, etc. The processor 240 may use the stream metadata to perform, in a second operation titled 'PerformImageMatching(content, metadata)' an image matching, e.g., for generating a video panorama, and may suggest orchestration guidelines to the controller 260 in a third operation titled 'SendMediaOrchestrationGuidelines'. From these guidelines, the controller 260 may derive orchestration metadata in a fourth operation titled 'ComputeMediaOrchestrationMetadata' and send them to the recording device 100, and possibly to other recording devices, in a fifth operation titled 'SendMediaOrchestration(content, timestamps)' the form of respective media orchestration metadata streams. Such orchestration metadata may take the form of proposed capture timestamps, correlation timestamps, capture masks, signal transformations, sensor adjustments, information on co-recording devices and more. The recording device 100 may then adjust the recording based on the orchestration metadata in a sixth operation titled 'AdjustCapture'.

Identification Information

It will be appreciated that the stream source may, in response to the orchestration metadata comprising identification information, selectively record the contributing part of the video stream, discard non-contributing parts before encoding the video stream, and/or, discard, or reduce a bitrate of, non-contributing parts during the encoding of the video stream. The identification information may take the form of a mask, e.g., a capture mask referring to the fact that the mask may be applied to the captured video data, which may be applied by the recording device at different stages of the generating the video stream. It is noted that the capture mask may be expressed in absolute or relative values. The former has the advantage that it is independent from the actual coordinate system to which it applies. In an example, the capture mask may be transmitted to the sensor as input parameter. Upon reception, the sensor may then crop out some pixels from the full frame captured by the sensor in accordance with the capture mask and provides the 'cropped-out' frame as the raw captured frame.

In another example, the recording device may apply a post-processing operation on the full frame captured by the sensor. The result of this post-processing operation may be a cropped-out frame whose location and size in the raw captured frame are indicated by the capture mask. In another example, the capture mask may be provided to the video encoder as input parameter. The video encoder may apply pre-processing filter such as cropping, but also pre-processing operations such as resolution scaling, de-noising, etc. A well-known open source tool termed FFmpeg (see http://ffmpeg.org/) provides all of these functionalities as explained in the documentation (http://ffmpeg.org/ffmpeg-all.html). However, in a command-line tool, the capture mask may effectively become a static configuration of the encoder. This may have as disadvantage that when the capture mask changes, the ongoing encoding operation may need to be stopped and a new encoding operation be started.

In another example, the capture mask may be applied dynamically inside a video encoding instance, namely by applying the capture mask in the video encoding pipeline before the actual encoding of the video frames. As a specific and non-limiting example, a development kit such as the Intel Media SDK or a media pipeline framework such as GStreamer (see http://gstreamer.freedesktop.org/) may be used to build a customized video encoding pipeline wherein the capture mask can be dynamically changed within the same encoding instance. Consequently, in order to change the size of the encoded frames, the video encoder may signal these changes to the receiver of the video stream, e.g., a server, accordingly. For instance, the HEVC video coding standard, ISO/IEC 23008-2:2015, defines NAL (Network Abstraction Layer) units that carry such metadata. In particular, every time the frame size changes based on update capture mask, the video encoder may insert a new Sequence parameter set (SPS) containing the new values of pic_width_in_luma_samples and pic_height_in_luma_samples, i.e., the frame dimensions. When other video coding standards are used, similar measures may be taken to correctly signal the varying frame dimensions to the receiver of the video stream.

Adjustment Instructions

As also described with reference to FIGS. 3 and 5, one or more adjustment instructions may be included in the orchestration metadata which are indicative of an adjustment in the recording of the video stream which may result in an adjustment and thereby change of the contributing part of the video stream. For example, the adjustment instructions may result in a change in the position and/or size of a spatial region for a spatial composite. The one or more adjustment instructions may be user instructions for, when provided to the user, enabling the user to adjust a view of the scene being recorded by the recording device. However, the one or more adjustment instructions may also be applied autonomously or semi-autonomously by the device itself. For example, if the recording device has pan and/or zoom functionality, the adjustment instructions may instruct the recording device to perform a pan and/or zoom. The one or more adjustment instructions may also be conditionally included in the orchestration metadata, e.g., when an overlap between the view provided the video stream and the view provided by another one of the plurality of video streams crosses a predetermined threshold. For example, in case of a spatial composite, the adjustment instructions may be provided when the overlap between the views becomes too large, resulting in too much redundancy in the video streams, but also when the overlap between the views becomes too little and thus hinders the image matching process.

Processing Instructions

As briefly indicated with reference to FIG. 3, one or more processing instructions may be included in the orchestration metadata which may be indicative of one or more pre-processing steps to be applied by the stream source to at least part of the contributing part of the video stream. For example, the one or more pre-processing steps may comprise temporally interpolating video frames to match a recording timestamp included in the orchestration metadata, e.g., by using techniques such as motion-compensated temporal up/down conversion. This would allow for multiple sources to capture frames at exactly the same moments in time, thereby further optimizing the stitching later on. Likewise, the stream source may be instructed to simply drop a video frame to match a recording timestamp included in the orchestration metadata, apply a homographic transformation to a video frame or adapt an image characteristic such as contrast, brightness, saturation, white point, to a reference value included in the orchestration metadata. Such pre-processing may enable part of the computational load of generating the output video to be offloaded to one or more of the stream sources. It will be appreciated that the identifying of the contributing part in the orchestration metadata may also be seen as a pre-processing instruction, as it is indicative of the pre-processing step of selectively streaming of the contributing part. As such, in an embodiment, the identification information identifying the contributing part may be provided in the form of a pre-processing instruction instructing the stream source to selectively stream the contributing part.

Other General Aspects

It will be appreciated that the invention as claimed may be used with all suitable video coding/container formats and streaming protocols, including but not limited to H.264/HEVC over RTP, HLS, MPEG2-TS, MP4 and MPEG-DASH. As output video, a video stream may be generated. In a specific example, if the output video provides a composite, a composite video stream may be generated as output.

The system for generating the output video may be implemented in a server, but also in a recording device, in one or more network entities of a network, or in a network stack of a rendering device which is to render the output video, etc.

The output video may be any kind of video which combines video data from multiple video streams, including but not limited to video panoramas, 360 degree videos, mosaic videos or enhanced videos, with examples of enhancements including higher spatial resolution and/or higher temporal resolution. Techniques for creating such output videos from a plurality of video streams are known per se in the art of video processing.

The orchestration metadata may be provided to the stream source directly or indirectly. An example of the latter is that the orchestration metadata is uploaded, e.g., by a stitching server, to a webserver. The webserver may deliver the metadata via HTTP to a smartphone, which may then deliver the metadata to a recording device which is connected to the smartphone, e.g., via a Bluetooth connection.

Figure 7:
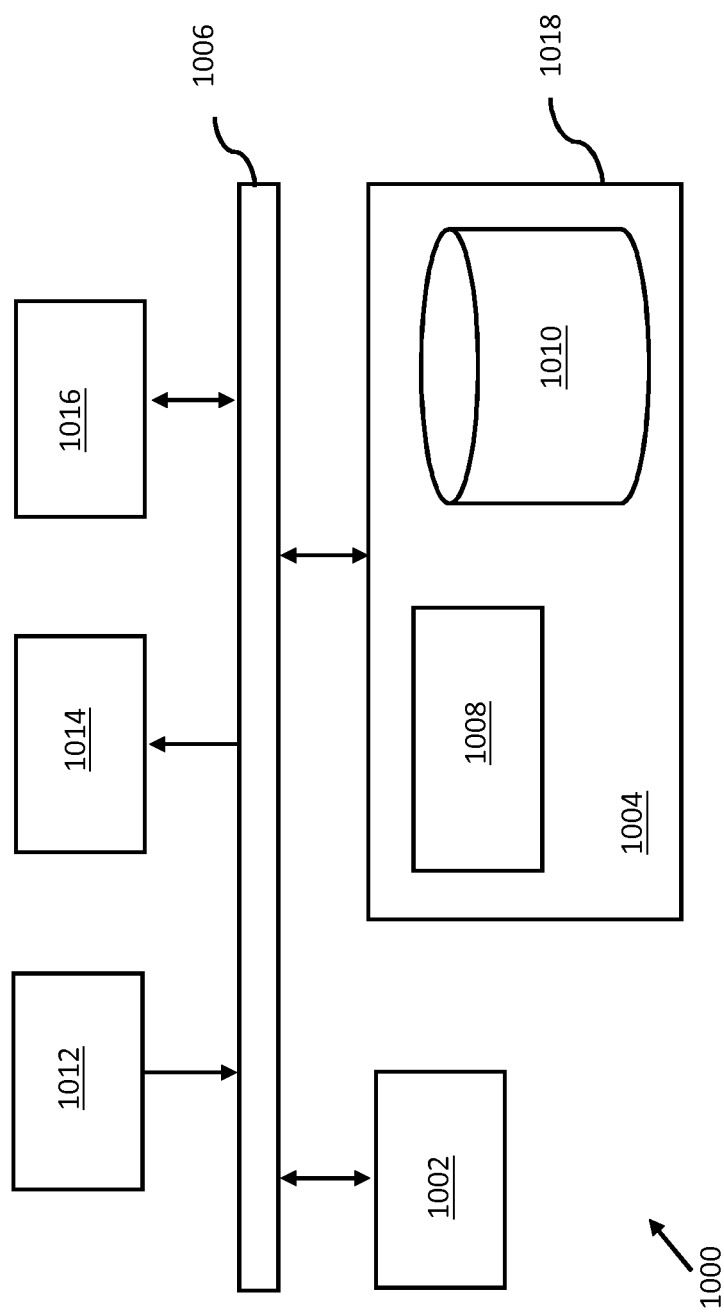
FIG. 7 shows an exemplary data processing system.

FIG. 7 is a block diagram illustrating an exemplary data processing system that may be used in the embodiments of this disclosure. Such data processing systems include data processing entities described in this disclosure, including servers, client, devices, controllers, etc. Data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 7, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system may represent a system for generating an output video from a plurality of video streams. In that case, application 1018 may represent an application that, when executed, configures data processing system 1000 to perform the various functions described herein with reference to a "system for generating an output video from a plurality of video streams". Examples of such systems include, but are not limited to, personal computers, workstations, laptops, servers, servers configured for use in a client-server mode, etc.

In another aspect, data processing system 1000 may represent a stream source. In that case, application 1018 may represent a streaming application that, when executed, configures data processing system 1000 to perform the various functions described herein with reference to a "stream source". Examples of stream source can include, but are not limited to, (HTTP) streaming servers, stream buffer servers which buffer media stream(s) within a media distribution network, and recording devices which comprise (audio-)visual sensors and which may be configured to function as stream sources. Examples of such recording devices include smartphones, compact cameras, professional cameras, smart watches, smart glasses, etc.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for generating an output video from a plurality of video streams representing different recordings of a scene, the method comprising:
   receiving the plurality of video streams;
   analyzing the plurality of video streams to identify a contributing spatial part of a video stream, the contributing spatial part comprising at least one spatial part of at least one of the plurality of video streams which is to be used in the output video;
   generating orchestration metadata identifying the contributing spatial part;
   providing the orchestration metadata to a stream source from which the video stream originated to enable the stream source to selectively stream the contributing spatial part of the video stream, wherein the stream source performs the selective streaming at least by discarding non-contributing spatial parts of the video stream before or in the encoding of the video stream; and
   receiving from the stream source the selectively streamed contributing spatial part of the video stream.

2. The method according to claim 1, wherein the output video is a composite of the plurality of video streams.

3. The method according to claim 2, wherein the composite is a spatial composite of the plurality of video streams, and wherein the contributing spatial part is a spatial region of the video stream which is to be included in the spatial composite.

4. The method according to claim 3, wherein the stream source is a recording device, and wherein the method further comprises including one or more adjustment instructions in the orchestration metadata, the one or more adjustment instructions being indicative of an adjustment in the recording of the video stream which changes a size or location of the spatial region in the spatial composite.

5. The method according to claim 4, wherein the one or more adjustment instructions are user instructions for, when provided to the user, enabling the user to adjust a view of the scene being recorded by the recording device.

6. The method according to claim 4, wherein the one or more adjustment instructions are conditionally included in the orchestration metadata.

7. The method according to claim 2, wherein the orchestration metadata comprises a set of coordinates and/or a mask identifying the spatial region of the video stream.

8. The method according to claim 1, further comprising the stream source, in response to the orchestration metadata, performing at least one of:
   selectively recording the contributing spatial part of the video stream; and
   discarding non-contributing spatial parts before encoding the video stream.

9. The method according to claim 1, further comprising including one or more processing instructions in the orchestration metadata, the one or more processing instructions being indicative of one or more pre-processing steps to be applied by the stream source to at least the contributing spatial part of the video stream.

10. The method according to claim 9, wherein the one or more pre-processing steps are at least one of:
    temporally interpolating video frames to match a recording timestamp included in the orchestration metadata;
    dropping of a video frame to match a recording timestamp included in the orchestration metadata;
    applying a homographic transformation to a video frame; and
    adapting an image characteristic to a reference value included in the orchestration metadata.

11. The method according to claim 1, further comprising the stream source, in addition to the video stream, making available stream metadata for use in generating the output video.

12. The method according to claim 11, wherein the stream metadata comprises at least one of:
    keypoint information identifying an image feature in the video stream;
    depth information associated with the video stream;
    clock information; and
    sensor information of a sensor used in recording the video stream.

13. A non-transitory computer-readable medium comprising a computer program, the computer program comprising instructions for causing a processor system to perform the method according to claim 1.

14. A system for generating an output video from a plurality of video streams representing different recordings of a scene, the system comprising:
    an input interface for receiving the plurality of video streams;
    a processor configured for analyzing the plurality of video streams to identify a contributing spatial part of a video stream, the contributing spatial part comprising at least one spatial part of at least one of the plurality of video streams which is to be used in the output video;
    a controller configured for generating orchestration metadata identifying the contributing spatial part; and
    an output interface for providing the orchestration metadata to a stream source from which the video stream originated to enable the stream source to selectively stream the contributing spatial part of the video stream at least by discarding non-contributing spatial parts of the video stream before or in the encoding of the video stream;
    wherein the input interface is further configured for receiving from the stream source the selectively streamed contributing spatial part of the video stream.

15. A stream source for streaming a video stream, the video stream representing a recording of a scene, the stream source comprising:
- an input interface for receiving orchestration metadata, the orchestration metadata identifying a contributing spatial part of the video stream, the contributing spatial part comprising a spatial part of the video stream which is to be selectively streamed;
- a processor for selectively processing the contributing spatial part of the video stream, wherein the selectively processing comprises discarding non-contributing spatial parts of the video stream before or in the encoding of the video stream; and
- an output interface for selectively streaming the contributing spatial part of the video stream.

16. The method according to claim 6, wherein the one or more adjustment instructions are conditionally included in the orchestration metadata when an overlap between the view provided and the view provided by another one of the plurality of video streams exceeds a predetermined threshold.

\* \* \* \* \*